United States Patent

[11] 3,580,283

| [72] | Inventor | Robert W. De Vries |
| | | Grand Rapids, Mich. |
| [21] | Appl. No. | 793,689 |
| [22] | Filed | Jan. 24, 1969 |
| [45] | Patented | May 25, 1971 |
| [73] | Assignee | Wolverine Brass Works, a Division of Wolverine Industries, Inc. |
| | | Grand Rapids, Mich. |

[54] SINGLE LEVER VALVE FOR AUTOMATIC WASHERS
11 Claims, 8 Drawing Figs.

[52] U.S. Cl. ............................................ 137/625.18
[51] Int. Cl. ............................................. F16k 11/06
[50] Field of Search ............................... 137/625.18, 625.19, 625.23, 625.43; 251/368, 172, 174

[56] References Cited
UNITED STATES PATENTS

| 477,398 | 6/1892 | Anderson | 137/625.43 |
| 1,134,493 | 4/1915 | Skinner et al. | 137/625.18X |
| 1,495,870 | 5/1924 | O'Donnell et al. | 137/625.18 |
| 1,717,012 | 6/1929 | Dixon | 137/625.43(X) |
| 2,519,574 | 8/1950 | Holl | 137/625.43 |
| 2,696,219 | 12/1954 | Barksdale | 137/625.43 |
| 2,745,434 | 5/1956 | Stevenson | 137/625.43 |
| 3,193,245 | 7/1965 | Parker | 251/172 |
| 3,292,898 | 12/1966 | Willman | 251/368(X) |

*Primary Examiner*—M. Cary Nelson
*Assistant Examiner*—R. B. Rothman
*Attorney*—J. Warren Kinney, Jr.

ABSTRACT: The valve is a single-lever shutoff valve for simultaneously terminating flow of hot and cold water supplied to an automatic washer or similar machine. The valve embodies a minimum number of simple and inexpensive parts, and is operable with great ease and despatch, to discourage the hazardous practice of leaving the machine elements pressured with hot and cold water when not in use.

Patented May 25, 1971
3,580,283
2 Sheets—Sheet 1
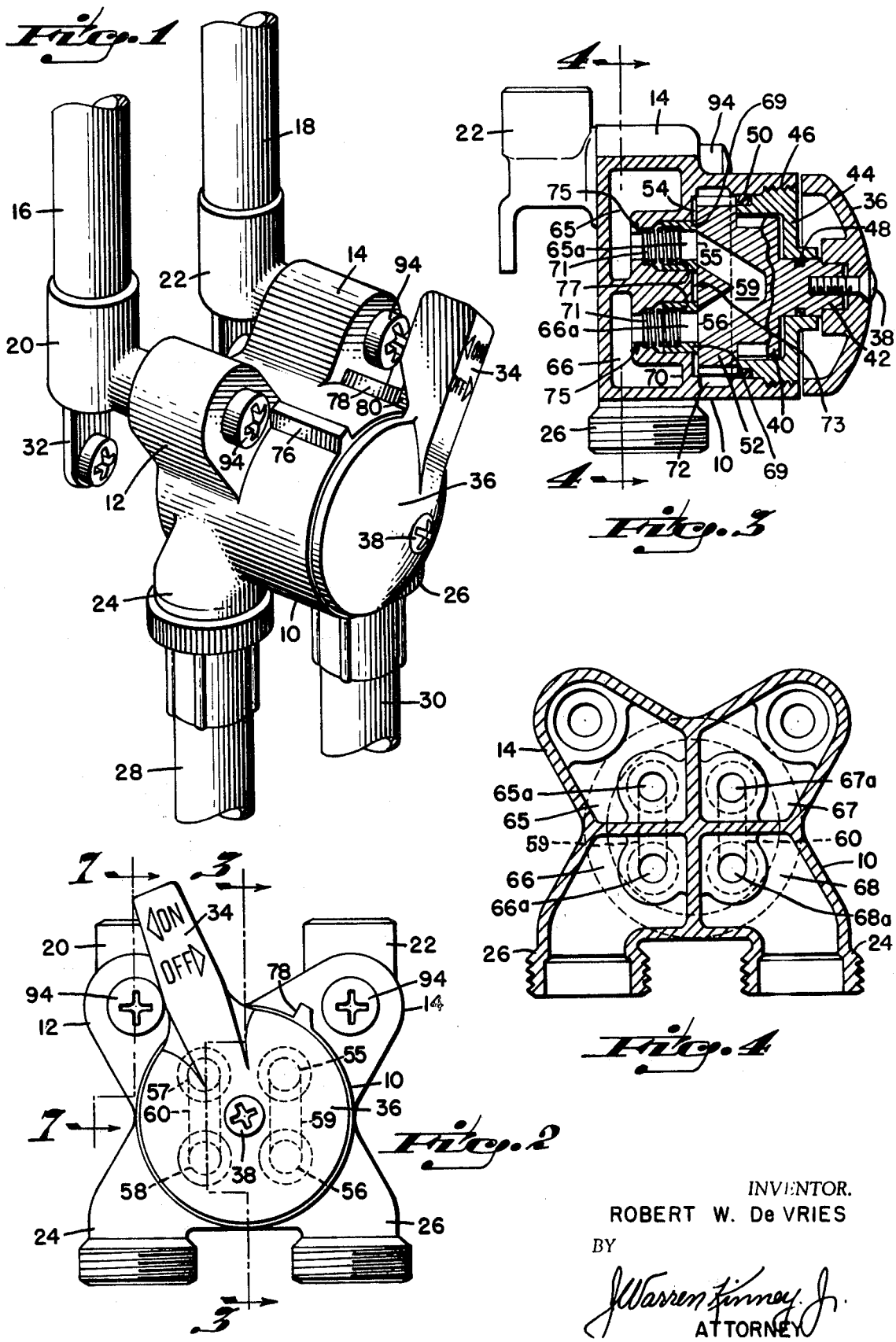
INVENTOR.
ROBERT W. De VRIES
BY
J. Warren Kinney Jr.
ATTORNEY Patented May 25, 1971

INVENTOR.
ROBERT W. De VRIES
BY
*Warren Kinney Jr.*
ATTORNEY

SINGLE LEVER VALVE FOR AUTOMATIC WASHERS

This invention relates to a valve for automatic washers, such as clothing washing machines or machines for other washing purposes, wherein use is made of hot and cold water supplied through separate hot and cold water supply pipes.

Common practice has been to make connections between the washing machine and the supply pipes by means of flexible hoses. The supply pipes were ordinarily furnished with common gate valves or globe valves, to be closed after a washing operation in order to relieve the hoses of water pressure, and thereby eliminate the possibility of hose rupture and flooding of the premises in which the washing machine is installed.

It has been determined that many users of washing machines are inclined to ignore the valves of the supply pipes, leaving them usually in open position with pressure of water in the hoses, because of the inconvenience involved in turning the valve stems to the open and closed positions, this usually requiring a number of turns of the valve stems of both the hot and the cold water shutoff valves. To some users this chore is highly distasteful, and remains undone.

An object of the present invention is to provide a valve for the purpose stated, whereby a mere 45° turn of a single lever, manipulated without effort, skill, or inconvenience, effectively and quickly closes off or opens both water supply pipes simultaneously, so that the user is induced to shut off the supply of hot and cold water to the flexible hoses upon completion of a washing operation, thereby to minimize the likelihood of hose rupture and possibly other damage to the washing machine components resulting from constant exposure to pressure of water.

Another object of the invention is to provide a single lever operated valve of unusual simplicity, which is very inexpensive to manufacture and assemble, and possesses the virtues of great durability, reliability, and freedom from servicing problems.

A further object of the invention is to provide a quick-action valve of the character stated, which may easily and quickly be adjusted or serviced when necessary, without disconnecting it from the supply pipes or the washing machine served thereby.

The foregoing and other objects are attained by the means described herein and illustrated upon the accompanying drawings, in which:

FIG. 1 is a perspective view of the improved valve, shown connected to hot and cold water supply pipes.

FIG. 2 is a front elevation of the same, the valve being shown open, and the pipes and hoses omitted.

FIG. 3 is a vertical cross section taken on line 3-3 of FIG. 2.

FIG. 4 is a cross section taken on line 4-4 of FIG. 3.

Figure 5:
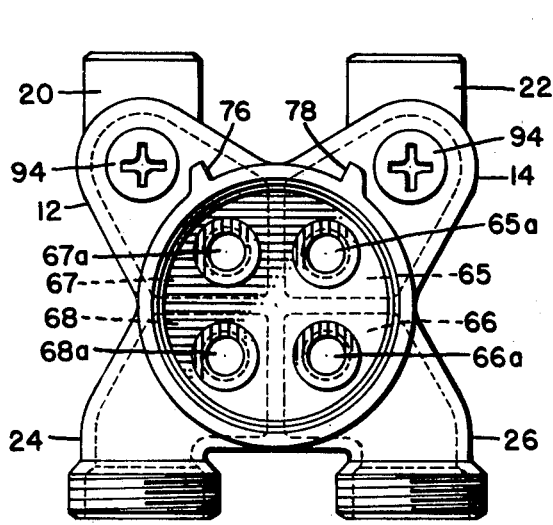
FIG. 5 is an elevational view similar to FIG. 2 with the operating lever and valving member removed.

With reference to the drawing figures, the numeral 10 indicates a valve body shown herein as generally cylindrical of exterior shape, though not necessarily so, and formed preferably of a nonferrous metal such as brass, bronze, or other material resistive to corrosion and wear. The body may carry two integral hollow intake bosses 12 and 14 connectable, respectively, to cold and hot water supply pipes 16 and 18 through the agency of fittings 20 and 22.

Output bosses for cold and hot water are denoted 24 and 26, respectively, and these may be provided with screw threads as shown, for effecting connection with the coupling members of cold and hot water flexible delivery hoses 28 and 30 leading to an automatic washer or other machine. The several bosses 12, 14, 24 and 26 are disposed in a generally common vertical plane for the benefit of compactness and structural strength of the valve body; and mounting of the body upon a wall or upright support may be effected by way of ears 32 provided on the fittings 20 and 22, or otherwise, as desired.

The operating lever for the valve is denoted 34, and a screw or other fastener 38 whereby the cover may be detachably fixed to a valving member 40. The valving member includes a central stud shaft 42 into which the screw 38 is anchored, and said stud shaft is rotatably supported by a stationary bushing member or retainer 44 threadedly connected at 46 within the valve body. An O-ring 48 or other suitable sealing means precludes leakage of water along the stud shaft. Other sealing means, such as an O-ring 50, precludes leakage along the threaded connection at 46.

Figure 6:
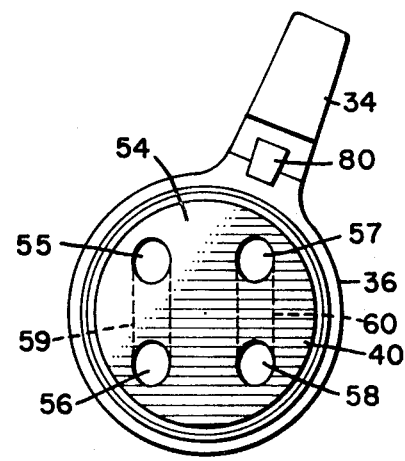
FIG. 6 is a rear view of the operating lever and valving member applicable to FIG. 5.

The valving member includes an integral enlarged head 52 of considerable thickness, and having a smooth planar end bearing face 54. Four openings are formed in face 54 according to FIGS. 3 and 6, these openings being identified by the numerals 55, 56, 57 and 58. The openings extend into head 52 as passageways, it being noted that opening 55 communicates with opening 56 to form passageway 59, and opening 57 communicates with opening 58 to form passageway 60, within the material of the valving head 52. Passageways 59 and 60 preferably are spaced from one another in substantially parallel planes, and their openings 55, 56, 57, 58 are equally spaced apart, FIG. 6.

Partitions formed interiorly of the valve body serve to subdivide the body into four chambers 65, 66, 67, 68, (FIGS. 4 and 5). Chamber 65 is in fluid communication with the interior of intake boss 14; chamber 66 with the interior of output boss 26; chamber 67 with the interior of intake boss 12; and chamber 68 is in fluid communication with the interior of output boss 24.

The transverse wall 70 which separates the four body chambers aforesaid from the chamber 72 that houses the valving member 40, has four ports 65a, 66a, 67a and 68a, (FIG. 4), each of which may be lined with a replaceable bushing as best illustrated at 65a and 66a of FIG. 3. The bushings of the ports 65a, 66a, 67a, and 68a, have termini equally spaced apart in conformity with the spacing of the passageway openings 55, 56, 57, 58 of valving member 40, FIG. 6.

It may here be noted that the bushings 69 lining the ports 65a, 66a, 67a and 68a, are formed preferably of a rubberlike resilient material such as Nitrile or Buna-n. Each bushing is in the form of a short sleeve snugly fitted into a port so that fluid may not escape along the outer surface of the bushing; and in a preferred form of the bushing its outer surface may be grooved concentrically in aid of forming a leakproof seal with the supporting wall of a port. The hardness of the bushing material may approximate 70 durometer, and should be such as to withstand extremes of low and high temperatures that may be encountered in various installations of the valve.

In the example of FIG. 3, the port bushings are shown spring-urged endwise, as by means of compression springs 71, 71, against the bearing face 54 of valving member head 52. Bearing face 54 preferably is spaced slightly from the planar face 73 of transverse wall 70, to ensure effective leakproof slidability of the adjacent bushing ends upon the bearing face 54, in both the open and closed condition of the valve. Bearing face 54 preferably is characterized by an inherently slippery wear-resistant surface, which may be accomplished in various ways. In the example illustrated, said inherently slippery wear-resistant surface results from forming the entire valving member 40 of Polysulfone, No. P-1700, a product of Union Carbide Corporation. As an alternative, the valving member might be formed of other suitable materials, having the bearing face 54 thereof coated or otherwise treated to provide the desired frictionless wear-resistant characteristic.

Each bushing spring 71 may be formed of stainless steel or equivalent noncorrosive material. One end of the spring may rest against an annular shoulder 75 of a port, while the opposite end thereof bears against a shoulder 77 formed within the bushing. All of the bushings for the body ports are to be yieldingly biased by springs such as 71, in substantially the manner above explained, or by equivalent means.

Figure 8:
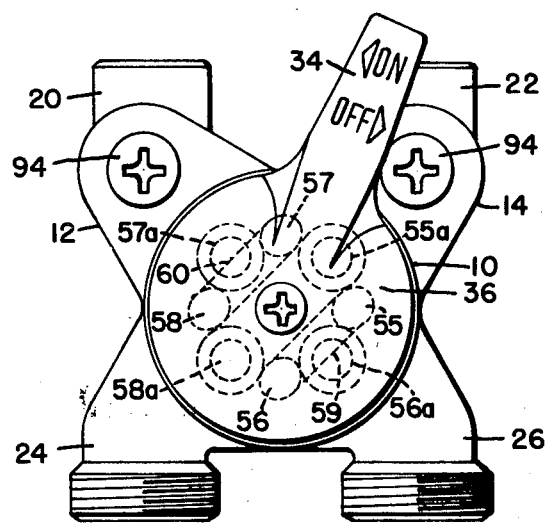
FIG. 8 is a view similar to FIG. 2, with the operating lever moved into position for opening the valve.

As will best be understood by referring to FIG. 8, the operating lever 34 when moved to the right as there shown, will dispose out of register the group of openings 55, 56, 57, 58 relative to the group of ports 55a, 56a, 57a, 58a. In the alternative, as illustrated by FIG. 2, movement of lever 34 to the left results in placing in register the openings 55, 56, 57, 58 with the ports 55a, 56a, 57a, 58a. From this it will be understood that the situation of FIG. 8 cuts off completely all flow of water through the valve. On the other hand, and according to FIG. 2, disposition of the operating lever to the left permits flow of cold water from 20 to 24, through the registering ports by way of passageway 60; likewise, flow of hot water is provided for between 22 and 26 through passageway 59 and the ports in registry therewith.

From the foregoing, it will be understood that both cold and hot water can be completely shut off and refused entry into the hoses 28, 30 of an automatic washer, by the simple and effortless act of throwing the single operating lever 34 to one limit of its travel, as in FIG. 8. When cold and hot water are to be supplied to the hoses 28, 30, this is just as quickly and easily accomplished by moving the operating lever to its opposite limit of travel. The limits of movement of the operating lever may be established by stops 76 and 78 on the valve body, engageable by a lug 80 on the operating lever.

It should be noted that the bushings defining the stationary ports 65a, 66a, 67a and 68a, have sliding contact with the smooth face 54 of the movable valving member head 52 (FIG. 3). The port bushings as well as the valving member may easily be exposed for replacement whenever necessary, by removing the cover 36 and unscrewing the body bushing member 44.

Figure 7:
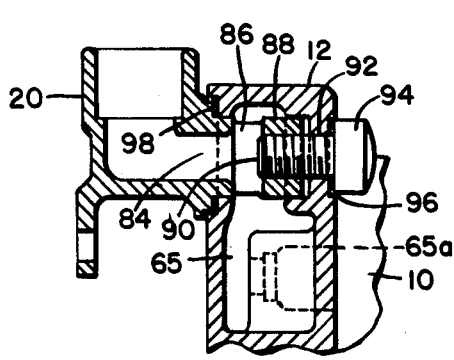
FIG. 7 is a fragmental enlarged cross section taken on line 7-7 of FIG. 2.

FIG. 7 illustrates an acceptable form of means to detachably connect a fitting such as 20 or 22 to the intake boss of the valve body. The fitting is seen to have a main bore 84 having a lateral branch 86 opening into the chamber 65. A solid inner transverse end portion 88 of the fitting is drilled and tapped to receive a screw 90, the shank of which passes through an opening 92 in boss 12. The head 94 of screw 90 bears against a gasket 96, to pull the fitting tightly against a gasket 98 for effecting a leakproof connection between the fitting and the intake boss of the valve body. By this means or equivalent structure, the valve in its entirety may quickly and easily be detached from supply pipes 16 and 18.

The single lever valve herein disclosed is seen to be compact, simple, and of minimal dimensions, so that it may be manufactured and serviced at low cost. Furthermore, as noted previously, manipulation of the single lever is convenient and effortless, thereby to encourage use of the valve for shutting off the cold and hot water supply whenever the equipment served by the valve is not in use.

What I claim is:

1. A shutoff valve for simultaneously controlling flow of hot and cold water under pressure comprising, a hollow body having two bosses at an upper end, each having an inlet opening in the lateral wall thereof, means associated with each inlet opening for connecting the hot and cold water pressure lines to the body, the body also having two bosses at a lower end each having an outlet opening therein, means on the lower bosses for connecting the lower bosses to outlet conduits, all of the bosses being in a common vertical plane, cross partitions in the body dividing the body into four chambers, each chamber having a port therein, the ports in the upper chambers being the inlet ports, and the ports in the lower chambers being the outlet ports, the inlet ports being in horizontal alignment and the outlet ports being in horizontal alignment and each inlet port being in vertical alignment with the corresponding outlet port, a valve seat on the body having the four ports therein and having a planar face, a valve rotatably mounted in the body having inlet and outlet openings in a planar face thereof, the valve openings being situated in the valve in the same relationship as the ports in the body, passageways in the valve connecting the inlet openings with the corresponding outlet openings, the valve having a stem thereon, a valve retainer threadingly connected with the body retaining the valve in position on the body, sealing means between the retainer and stem and within the threaded connection, the openings of the valve being in alignment with the ports in the body when in on position allowing full flow of the hot and cold water through the lines to the outlet conduits and being out of alignment when in off position thus stopping all flow, handle means on the stem actuating the valve between on and off positions, stop means on the body and engageable by the handle means limiting the movement of the handle in the on and off positions.

2. The valve as defined in claim 1, wherein is included a bushing detachably supported in each of said ports, and a terminal of each of said ports include corresponding ends of said bushings abutting the planar face of the rotary valve.

3. The valve as defined by claim 2, wherein the termini of said ports are constituted of rubberlike sleeves having ends yieldingly abutting said planar face of the rotary valve.

4. The valve as defined by claim 3, wherein at least that portion of the rotary valve which includes said planar face, comprises a plastic material characterized by an inherently low coefficient of friction and high resistance to corrosion and wear.

5. The valve as defined by claim 3, wherein the yielding abutment of said sleeve ends upon the planar face of the rotary valve, is maintained by the force of springs acting upon said sleeves in the direction of the valve.

6. The valve as defined by claim 5, wherein the springs aforesaid act individually upon the sleeves.

7. The valve as defined by claim 2, wherein said bushings are formed of resilient rubberlike material of the class of Buna-n.

8. The valve as defined by claim 7, wherein the planar face of the rotary valve is characterized by an inherently slippery low-friction wear and corrosion resistant surface.

9. The valve as defined by claim 7, wherein the combination includes individual compression springs acting constantly to urge said ends of the bushings into contact with the planar face of the rotary valve.

10. The valve as defined by claim 9, wherein at least that portion of the rotary valve which includes said planar face, comprises a material of the class of Polysulfone.

11. The valve as defined in claim 1, wherein the hot and cold water pipes have fittings extending outwardly therefrom, the fittings being received within the openings in the bosses at the upper end of the body, means carried by the body engaging the fittings and attaching the body to the fittings and sealing means between the fittings and the body.